UNITED STATES PATENT OFFICE.

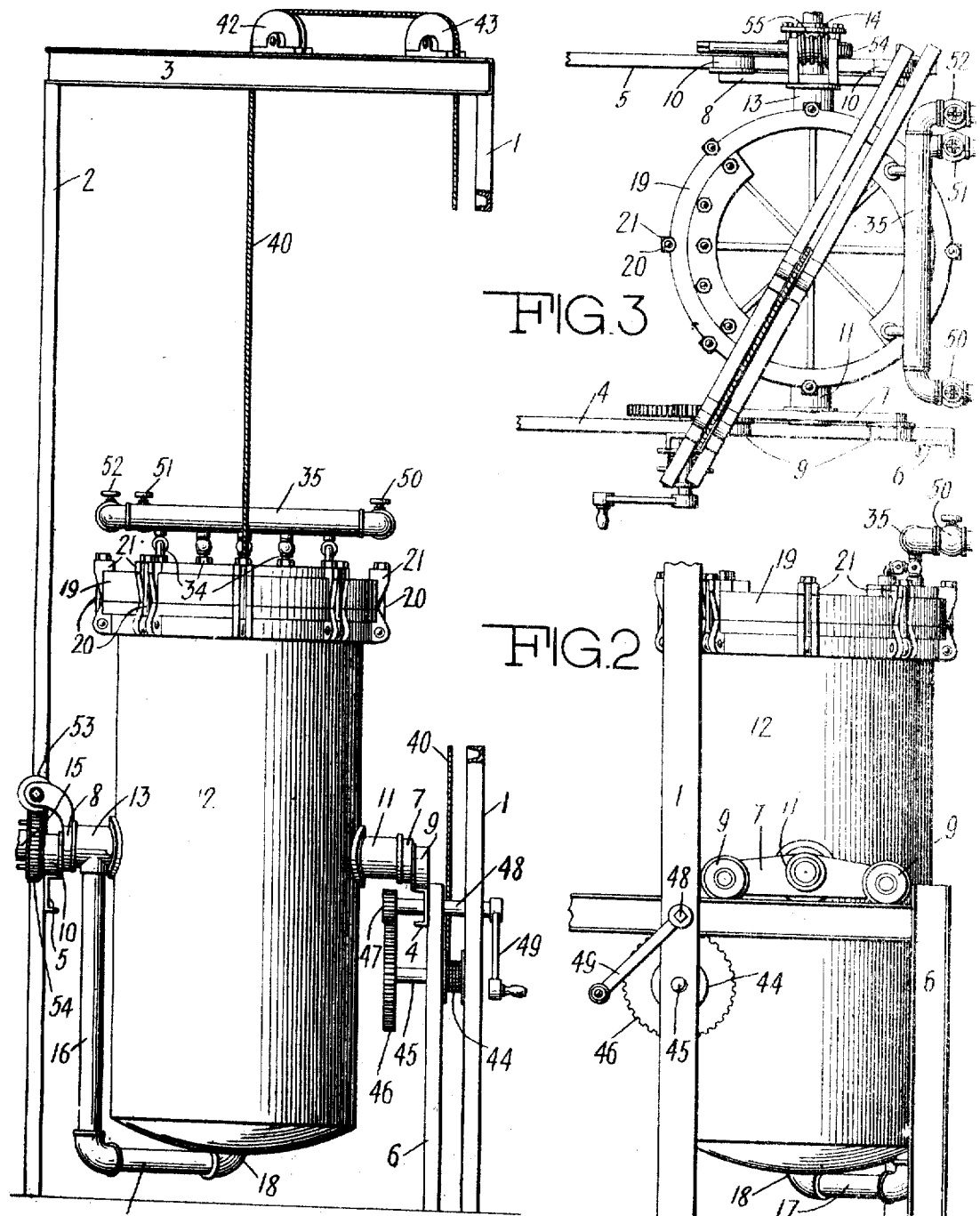

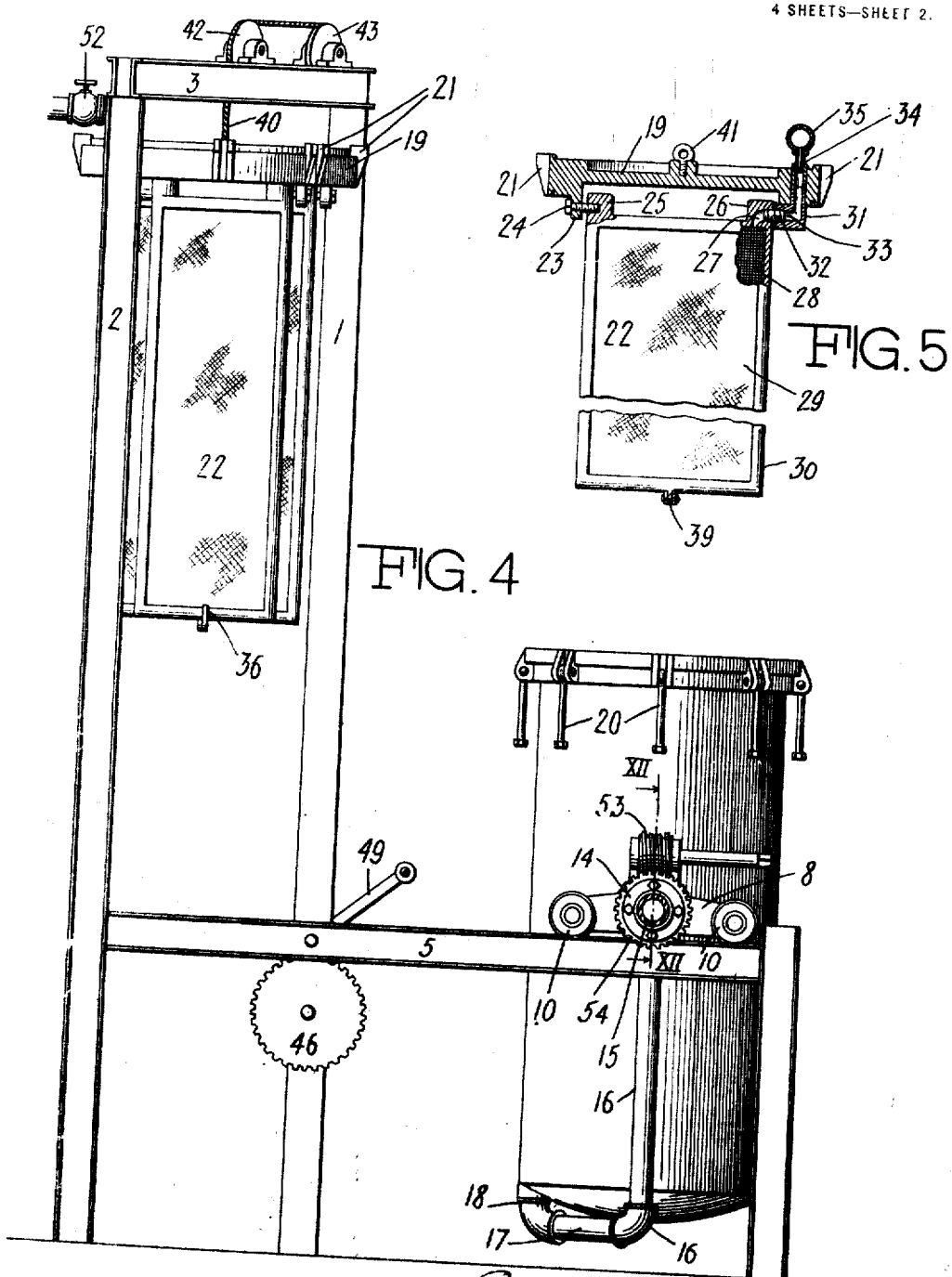

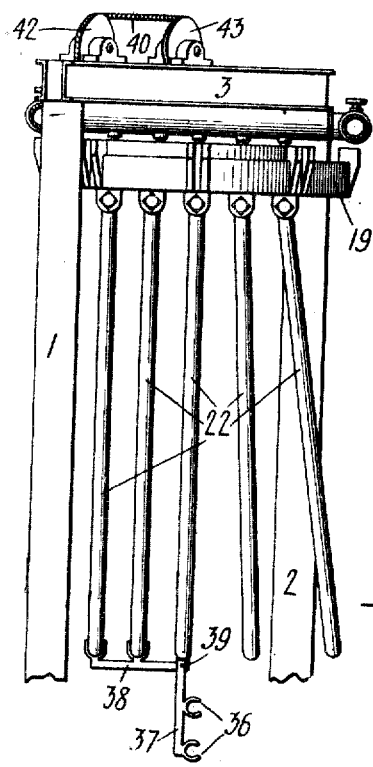
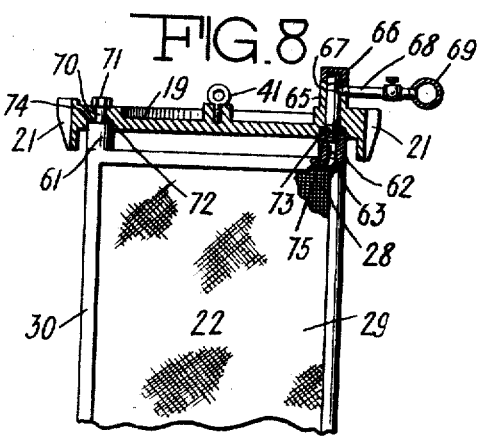
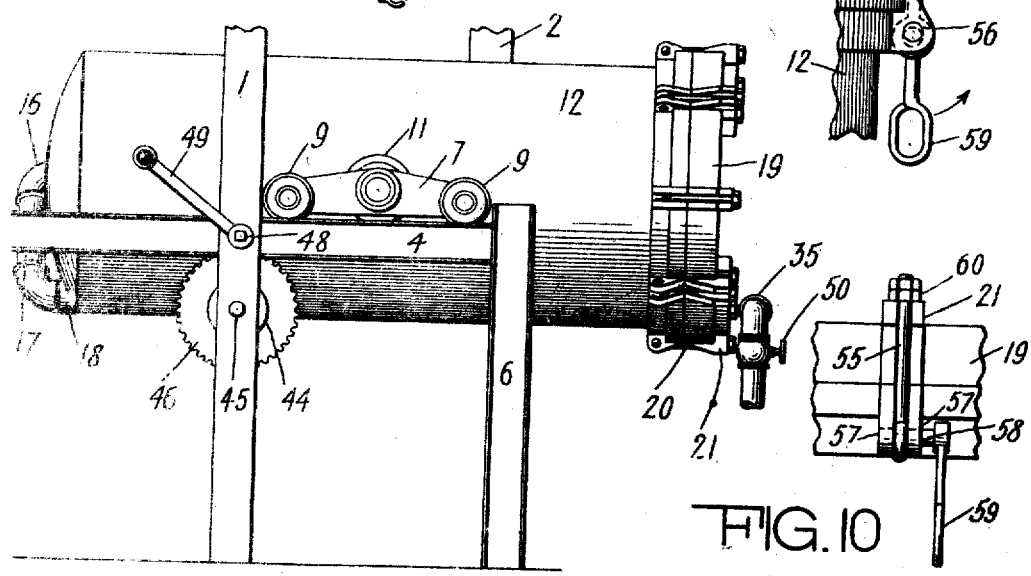

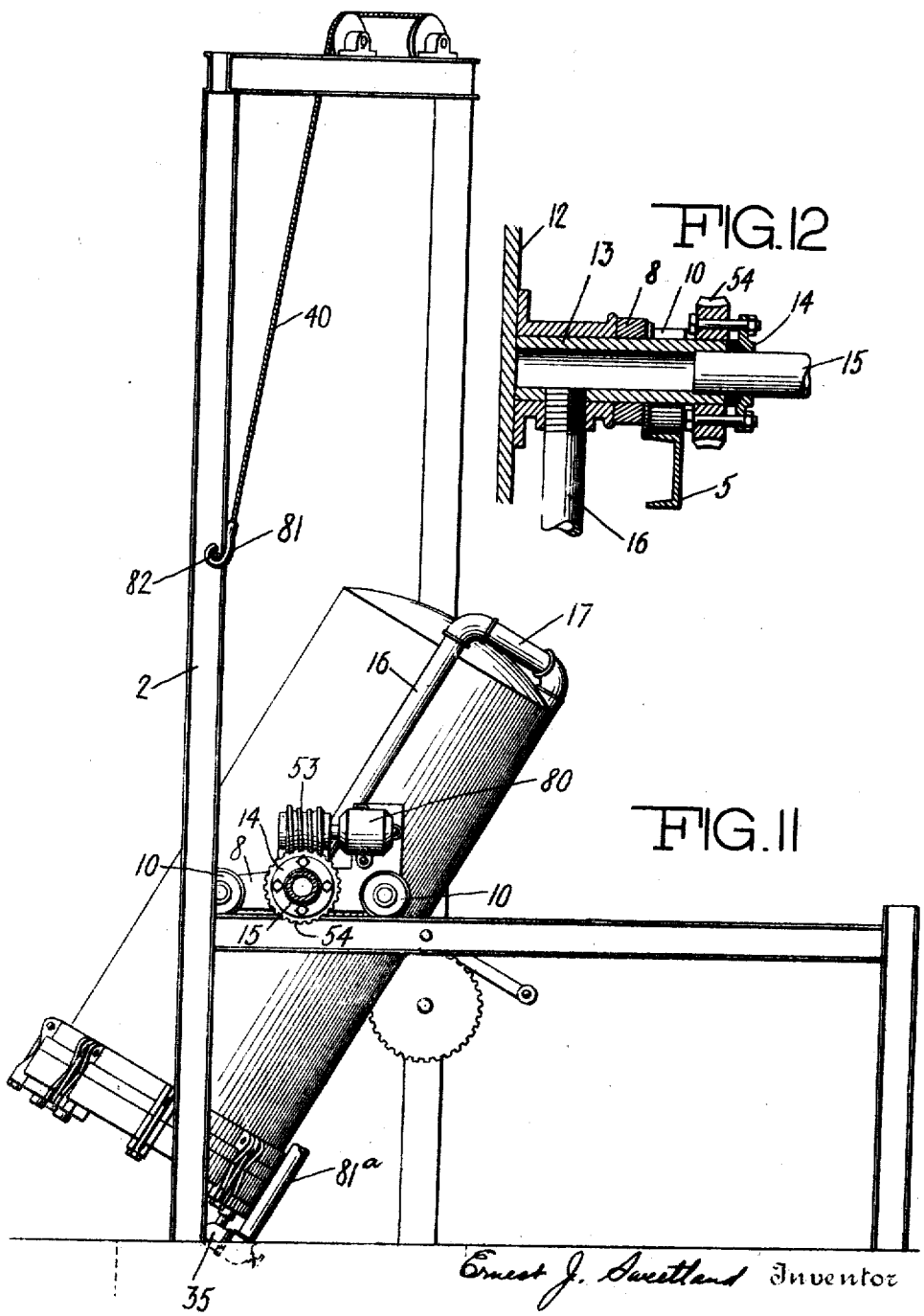

ERNEST J. SWEETLAND, OF MONTCLAIR, NEW JERSEY, ASSIGNOR, BY MESNE ASSIGNMENTS, TO UNITED FILTERS CORPORATION, A CORPORATION OF DELAWARE.

FILTER.

1,305,317.  Specification of Letters Patent.  Patented June 3, 1919.

Application filed June 24, 1916. Serial No. 105,763.

*To all whom it may concern:*

Be it known that I, ERNEST J. SWEETLAND, a citizen of the United States, residing in the town of Montclair, county of Essex, and State of New Jersey, have invented certain new and useful Improvements in Filters, of which the following is a specification.

My invention relates particularly to what are known in the art as "pressure filters" in which the sludge or liquid containing impurities or matter which it is desired to recover, is pumped under pressure into a container or casing, the only outlet from which is through the filtering surface of a number of filter elements or filter leaves. In apparatus of this general type it is desirable to construct the filter so that the casing will be under ready control for purpose of filtration and cleaning, and it is further desirable to position the leaves within the filter so as to obtain a maximum filtering effect while, at the same time, permitting their ready removal from the casing for the purpose of discharging of the filter cake which may have been deposited upon them by the process of filtration, and in order to effect any necessary repairs or replacement. In accomplishing these purposes, it is also economical to occupy a minimum area of floor space, and, at the same time, to supply the filter with such control means that it may be readily handled by a minimum number of attendants without impairing its efficiency during the various events of charging, filtration and cleaning or dumping.

In the accompanying drawings which form a part of this specification, Figure 1 is an end elevation of one type of filter embodying my invention. Fig. 2 is a side elevation of this filter. Fig. 3 is a top view of the structure of Fig. 2. Fig. 4 shows the filter elements lifted clear of the filter casing and the latter removed to one side. Fig. 5 is a detail view of the head of one of the filter leaves. Fig. 6 is a view similar to Fig. 2, but showing the filter in horizontal instead of vertical position. Fig. 7 shows the head and filter leaves raised clear of the filter casing and illustrates one method of hinging the leaves to the head. Fig. 8 is a view similar to Fig. 5 showing a modification. Figs. 9 and 10 are fragmentary views on an enlarged scale showing a type of locking bolt which is particularly advantageous in connection with the type of filter illustrated. Fig. 11 is a side elevation of a filter supplied with means for continuous rotation, if desired, and Fig. 12 is a detail longitudinal sectional view on line XII—XII of Fig. 4.

Referring to the drawings in detail, Figs. 1 and 2 designate vertical supporting posts which are connected at the top by a beam 3. Between these posts are parallel horizontal rails 4 and 5, suitably supported upon these posts and other vertical posts 6. Trucks 7 and 8 are provided, respectively, with wheels 9 and 10 supported upon the respective rails 4 and 5. Swiveled upon the truck 7 is a support 11 for the filter casing 12, the opposite side of which is rotatably mounted upon the truck 8, by means of a trunnion or hollow gudgeon 13, (see Figs. 4 and 12) connecting it at one end with a stuffing box 14, which affords communication from the pipe 15 through the trunnion to a pipe 16 which, in turn, is connected with a pipe 17 that enters the casing at the point 18, which is at the bottom of the casing when the latter is in the horizontal position shown in Fig. 6.

The casing is provided at one end with a detachable head 19, and a fluid-tight joint between the head and the main body of the casing is afforded by any suitable means, such as swing bolts 20 entering between the lugs 21 forming a part of the head. Suitable gaskets, not shown, may be used to insure a water-tight joint. To the head is secured a plurality of filter leaves 22, which may be preferably hingedly fastened to the head as indicated in Figs. 4, 5 and 7. In this type of construction the bottom of the head is provided with a plurality of depending lugs 23, through each of which passes a bolt 24, adapted to enter a suitable socket in a lug 25, projecting from one corner of the upper edge of the filter member or leaf. The other corner of the leaf is provided with a similar lug 26, through which is a passage 27, leading to the internal drainage area 28. This may be formed of heavy reticulated fabric, such as coarse wire screen, both faces of which are preferably covered with filter fabric 29, the whole being surrounded by the peripheral frame 20. A fitting 21 is secured in any suitable manner to the portion of the head adjacent to the lug 26 and rotatably receives a short pipe or nipple 32, which is mounted in the open end of the passage 27. It will be seen that this construction affords a clear passage for the filtrate from the internal drainage area of the filter leaf through passage 27, nipple 32, into the passage 33 in the fitting 31. This latter passage may lead through a gage glass 34 to the outlet manifold 35.

The filter leaves, when in operative position, are preferably secured together at their lower edges by means of yokes 36 (see Fig. 7) to the bars 37 and 38 pivoted at 39 to the central leaf. It will be observed that these resilient yokes or clips may be readily forced over the lower edge of the peripheral frame of each leaf and thus maintain the leaves uniformly spaced and prevent them from swinging. Means for lifting the head and the attached filter members out of the casing is provided in a cable 40 attached at one end to the head by means of a ring bolt 41 and passing over sheaves 42 and 43 mounted upon the beam 3. The cable may be attached to any suitable hoisting mechanism, such, for instance, as the drum 44, mounted on a shaft 45, to which is secured a gear 46, meshing with a gear 47 on shaft 48, which is adapted to be rotated by means of a crank 49.

The outlet manifold 35 may preferably be provided with three controlling valves 50, 51 and 52. Under normal conditions of operation the filtrate may be discharged through the valve 50, while the other valves are closed. For purposes of manipulation and cleaning, the valves 51 and 52 may be respectively connected to a compressed air line and to a vacuum line by means of flexible or other suitable connections, not shown.

The casing may be rotated about its transverse axis (the axis of the trunnion) by means of a worm 53 meshing with a worm wheel 54 carried upon the projecting end of the trunnion 13.

In place of the swing bolts 20 illustrated in Figs. 1 to 7 inclusive, I prefer in many instances to use the device shown in Figs. 9 and 10. In this form of apparatus each swing bolt 55 is mounted upon the body of the casing 15 by means of a short shaft 56, the portion of the shaft engaging the eye of the bolt being eccentric with reference to the ends of the shaft, the latter being journaled in the lugs 57, as clearly shown in Figs. 9 and 10. The shaft may be provided with an extending end 58, to which is attached the handle 59. The other extremity of the swing bolt may be provided with the nuts 60, adapted to engage the lugs 21 upon the head 19, as before. It will be seen that when the handle is in the position shown in Figs. 9 and 10, the axis of the eccentric portion of the shaft 57 is in the position most remote from the nuts on the bolts, and in this position the bolt will be tightly tensioned in place, thus drawing the head firmly against the face of the opening in the body of the filter casing in which it fits. When it is desired to loosen the bolts, it is simply necessary to swing the handle outward in the direction shown by the arrow in Fig. 9. Owing to the eccentricity of the shaft 57, this will automatically release the tension in the bolts and will permit them to be readily withdrawn from the lugs 21, without loosening the nuts 60. In practice I find it desirable to force the handle slightly farther to the left than the position indicated in Fig. 9. When the extreme position of the eccentric is passed, the device thereby becomes self-locking and there is no tendency for it to jar open, by the handle swinging in the direction of the arrow in Fig. 9.

In Fig. 8 I have shown a modification in which the filter leaves 22 are not hinged to the head so as to swing with reference thereto, but are rigidly, although detachably, secured to it. In this type the filter leaf is provided at each of its upper corners with the upwardly projecting lugs 61 and 62. The lug 61 is solid, while the lug 62 is provided with a passage 63, leading from the interior of the lug to a nipple 64 passing up through a suitable housing 65 which may be integral with the head casting and detachably held in place by means of a cap nut 66. The nipple is perforated at its side at 67, affording communication between its interior and the outlet pipe 68 which connects it to the outlet manifold 69. The lug 61 may be held in place by means of a solid upwardly extending stud 70, which engages a nut 71 clamping it against the head. The lugs 61 and 62 are preferably received in countersunk seats 72 and 73, respectively, in the head casting, and gaskets 74 and 75 may be provided for insuring a water-tight joint at this point.

In Fig. 11 I have illustrated a modification showing a substantially balanced type of filter which may be continuously rotated during any portion of the period of filtration, or during the entire interval when the filter is in operation. In this type of apparatus I provide a suitable source of power, such as motor 80, for continuously operating the worm 53, in order to rotate the gear 54, and thereby the filter itself. During this operation it will be appreciated that the cable 40 must be disconnected from the filter head, and the hook 81 which is adapted to engage the eye bolt 41, shown in Figs. 5 and 8, may be fastened out of the way in any convenient place, as by causing it to engage a pin 82 on the supporting post 2. This type of filter also differs from that previously described in that the outlet manifold 35 is preferably connected by suitable piping 81ª to a trunnion and stuffing box (not shown) mounted in the truck 7, and in other respects similar to the trunnion 13 and stuffing box 14. From this second stuffing box the filtrate may be led away in any suitable manner. It will be appreciated that by the provision of a stuffing box in each trunnion, the process of filtration may proceed without interruption during the continuous rotation of the filter. It will be seen that the construction of the stuffing box and outlet piping associated with the truck 7 will be substantially like that shown in Fig. 12, which illustrates the stuffing box in the truck 8, except for the omission of the worm wheel 54.

In the operation of the device, the sludge or liquid to be filtered is introduced into the filter casing through the pipe 15, stuffing box 14 and pipes 16 and 17. The only outlet for the liquid (which is usually introduced under a considerable pressure) is through the filter fabric 29 of each filter leaf into the drainage area and thence out through proper passages into the outlet manifold. The filter fabric 29 effectually bars the passage of any solid material, and such material builds up on the outside surface of each leaf in the form of a more or less dense deposit commonly known in the art as "filter cake". The process of filtration may continue, the clear filtrate being drawn off through the valve 50, until the cakes grow so thick that the rate of filtration is seriously reduced, when the process may be stopped, the supply of sludge being cut off at its source. At this stage of the operation the swing bolts may be loosened and the head, together with the filter leaves and other adhering filter cake, drawn vertically upward into the position shown in Fig. 4. The body of the filter casing may then be pushed to one side, as illustrated in Fig. 4, the trucks upon which the filter body is mounted, readily rolling along the rails 4 and 5. When the body of the casing is thus clear of the leaves, the solid matter or cake adhering to the leaves may be discharged therefrom into any convenient receptacle below the filter, and as an aid to this process, steam, compressed air, water or other cleaning agent may be introduced into the leaves through the valve 51 of the manifold 35, the valves 50 and 52, meanwhile, being closed. This process, known as "reversal of flow" is very effective in dislodging the cakes, and while it is going on, the body of the casing may be inverted from the position illustrated in Fig. 4, so as to dump from it any solid matter which may remain in it. It will be seen that the cleaning of the filter leaves is made particularly easy in the type of filter illustrated in Figs. 4 and 7, since the leaves may be swung apart something in the manner of the leaves of a book, as shown in Fig. 7. All that is necessary to accomplish this purpose is the release of the yokes or clips 36, also indicated in that figure.

While the above process is entirely satisfactory in filtering many substances, yet in filtering others the cake does not adhere strongly to the surface of the filter fabric and when such is the case, after shutting off the supply of sludge or liquid to be filtered, and following this up with such an amount of clear water as may be beneficial, it is desirable to apply suction to the cakes by closing the valves 50 and 51, and opening the valve 52 connected to a vacuum line. The cakes will thus be dried of their moisture and will also be caused temporarily to cling more firmly to the surface of the filter leaves, so that parts of the cakes will not break away while the leaves are being lifted out of the filter body, and the latter is being rolled into the position shown in Fig. 4.

One of the great advantages of my improved filter lies in the fact that filtration may be accomplished either with the filter casing in a vertical position, as shown in Fig. 1, or in a horizontal position, as shown in Fig. 6, or, in fact, in any desired variation or combination of these positions. I have found, in practice, that some materials filter much better with the leaves vertically disposed with reference to the filter casing, whereas other materials give better results when filtered with the leaves in a horizontal position. This filter combines in one structure the ability to filter in either way. Moreover, some materials during the process of filtration tend to settle more or less quickly to the bottom of the filter casing, and with them I find it desirable to carry on filtration in what may be termed the "hour glass method". When practising this form of filtration, the sludge or liquid to be filtered may be introduced into the filter casing when the latter is in an upright position, as shown in Fig. 1, and after filtration has thus proceeded, for an interval, the entire filter may be rotated through 180 degrees so that the material which has tended to settle at the bottom, is now at the top of the filter. This up-ending of the filter casing may be accomplished as often as is found desirable, the exact period depending of course upon the material being filtered and many other factors, such as the size of the filter.

Having thus described my invention, I claim:—

1. In a filter, a casing having an open end, a removable head for the open end of the casing, a series of spaced and substantially parallel filter leaves carried by the head and normally extending longitudinally through the casing, means for supporting the casing on an axis transverse to the casing and filter leaves, and means for rotating the casing about the said axis during the filtering operation.

2. In a filter, a casing having an open end, a removable head for the open end of the casing, a series of spaced and substantially parallel filter leaves carried by the head and normally extending longitudinally through the casing, means for supporting the casing on an axis transverse to the casing and filter leaves, means for rotating the casing about the said axis, and means for lifting the said head and leaves out of the casing when the latter is in an upright position.

3. In a filter, a casing provided with a head, means for rotatably supporting said casing about a transverse axis, a plurality of filter leaves mounted on said head and means for lifting said head and filter leaves out of the casing when the latter is in an upright position.

4. In a filter, a casing provided with a head, means for rotatably supporting said casing about a central transverse axis, a plurality of filter leaves mounted on said head and means for lifting said head and filter leaves out of the casing when the latter is in an upright position.

5. In a filter, a casing provided with a head, means for supporting said casing about a transverse axis and a plurality of filter leaves swingingly mounted on said head.

6. In a filter, a casing provided with a head, means for rotatably supporting said casing about a central transverse axis and a plurality of filter leaves swingingly mounted on said head.

7. In a filter, a casing provided with a head, a plurality of filter leaves swingingly mounted on said head and means for withdrawing said head and filter leaves from the casing as a unit.

8. In a filter, a casing provided with a head, means for rotatably supporting said casing about a central transverse axis, a plurality of filter leaves swingingly mounted on said head and means for withdrawing said head and filter leaves from the casing as a unit.

9. In a filter, a casing provided with a head, means for rotatably supporting said casing about a central transverse axis, a plurality of filter leaves swingingly mounted on said head and means for lifting said head and filter leaves out of the casing when the latter is in an upright position.

10. In a filter, a casing, a plurality of filter leaves therein, the outermost leaves being mounted to swing about an axis.

11. In a filter, a casing, a plurality of filter leaves therein, certain leaves being mounted to swing about an axis.

12. In a filter, a casing and a plurality of filter leaves therein, each leaf being mounted to swing about an axis.

13. In a filter, a casing, a plurality of substantially parallel filter leaves therein and means for mounting the outermost leaves within the casing so as to swing about an axis.

14. In a filter, a casing, a plurality of substantially parallel filter leaves therein, and means for mounting each leaf within the casing so as to swing about an axis.

15. In a filter, a casing, a plurality of substantially parallel filter leaves therein and means for mounting the outermost leaves within the casing so as to swing about an axis located at the edge of the leaf.

16. In a filter, a casing, a plurality of substantially parallel filter leaves therein, and means for mounting each leaf within the casing so as to swing about an axis located at the edge of the leaf.

17. In a filter, a casing, a plurality of substantially parallel filter leaves therein, and means for mounting each leaf within the casing so as to swing about an axis located at the edge of the leaf adjacent to said head.

18. In a filter, a casing provided with a head, a plurality of substantially parallel filter leaves and means for mounting the leaves upon the head so that the outermost leaves will swing about an axis parallel to the surface of the leaf.

19. In a filter, a casing provided with a head, a plurality of substantially parallel filter leaves and means for mounting each leaf upon the head so as to swing about an axis parallel to the surface of the leaf.

20. In a filter, a casing provided with a head, a plurality of substantially parallel filter leaves therein, and means for hinging each leaf to the head.

21. In a filter, a casing, a plurality of filter leaves mounted therein and adapted to swing about one of their edges, and means located at the opposite edge for preventing the mutual separation of the leaves at that point.

22. In a filter, a casing, a plurality of filter leaves mounted therein and adapted to swing about one of their edges and means located at the opposite edge for preventing the mutual separation of the leaves at that point, including a rigid bar connecting said leaves and having means adapted to detachably engage them.

23. In a filter, a casing, a plurality of filter leaves mounted therein, and adapted to swing about one of their edges, and means located at the opposite edge for preventing the mutual separation of the leaves at that point, including connecting means and yokes for engaging the free edges of said leaves.

24. In a filter, a casing, a plurality of filter leaves mounted therein and adapted to swing about one of their edges, and means located at the opposite edge for preventing the mutual separation of the leaves at that point, including connecting means and resilient yokes for engaging the free ends of said leaves.

25. In a filter, a casing, trunnions for supporting said casing at a central transverse axis and a conduit leading from a trunnion to a point of the casing near one end thereof, and at the bottom when the casing is in a horizontal position.

26. In a filter, a casing provided with a head, means for rotatably supporting said casing about a transverse axis, a plurality of filter leaves mounted on said heads and means for continuously rotating said filter during filtration.

27. In a filter, a casing, filter members therein, trunnions for rotatably supporting said casing, said trunnions being provided with separate passages communicating respectively with the interior of the casing and the interior of the filter members, pipes rotatably communicating with said passages and means for continuously rotating said casing.

ERNEST J. SWEETLAND.